March 6, 1928. 1,661,336

G. M. KATZ

REFRESHMENT MIXER

Filed Feb. 17, 1925

Inventor,
Gus M. Katz;
By Marvin Clem
his Attorney.

Patented Mar. 6, 1928.

1,661,336

UNITED STATES PATENT OFFICE.

GUS M. KATZ, OF NEW YORK, N. Y.

REFRESHMENT MIXER.

Application filed February 17, 1925. Serial No. 9,729.

This invention relates to improvements in devices for making, mixing and dispensing drinks and has as one of its objects to provide a pair of containers, one nested within the other and arranged to co-act when respectively inverted to act as a shaker in mixing and commingling the liquids to be used as a beverage.

A further feature is in the provision of a combination lemon juice extractor and strainer, arranged reversibly and adapted to act as a cover for the outer receptacle when not in use and to which it may be securely attached.

Another purpose is to provide a plurality of nested cups from which the beverage may be dispensed, said cups being normally supported within the device in such manner as to be immediately available. The invention shows the article combined into one item, consisting of nine individual parts.

These and other objects such as compactness, ease of conveyance and convenience of operation are secured by the novel construction and combination of parts hereinafter described and shown in the accompanying drawing, forming a material part of this disclosure, and in which:—

Figure 1:
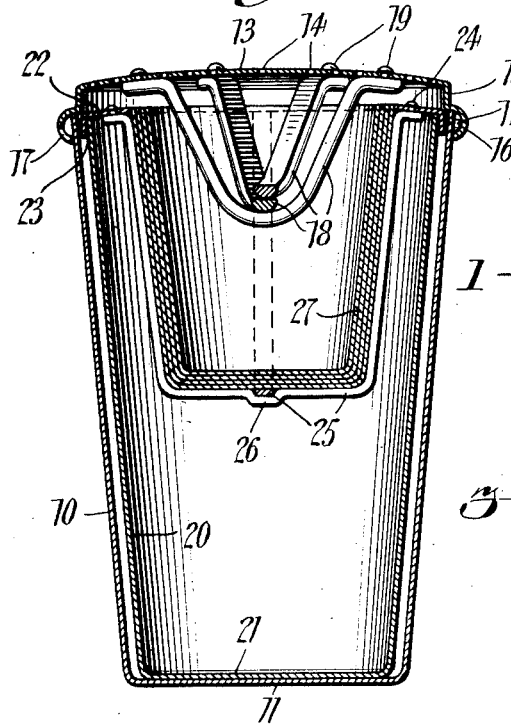
Figure 1 is a longitudinal sectional view of an embodiment of the invention completely assembled, the section being taken on line 1—1 of Figure 2.
Figure 2:
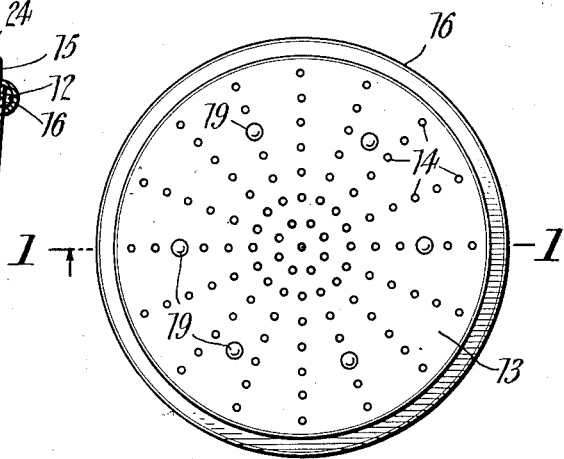
Figure 2 is a top plan view thereof.
Figure 3:
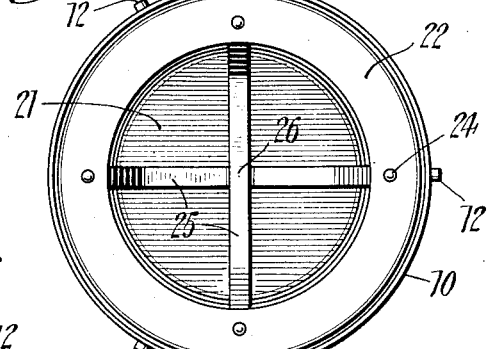
Figure 3 is a plan view with the cover removed.

Referring more in detail to the drawing, the numeral 10 designates the wall of the outer container, the same being slightly conical and provided with an integral bottom 11 at its smaller end and having fixed, near the open upper end, a plurality of short, radially extending pins 12.

A cap or cover 13, having a convexly curved raised surface, provided with a plurality of perforations 14, is formed with a cylindrical band 15 from which extends a bead 16 of substantially semi-cylindrical cross-section.

Figure 4:
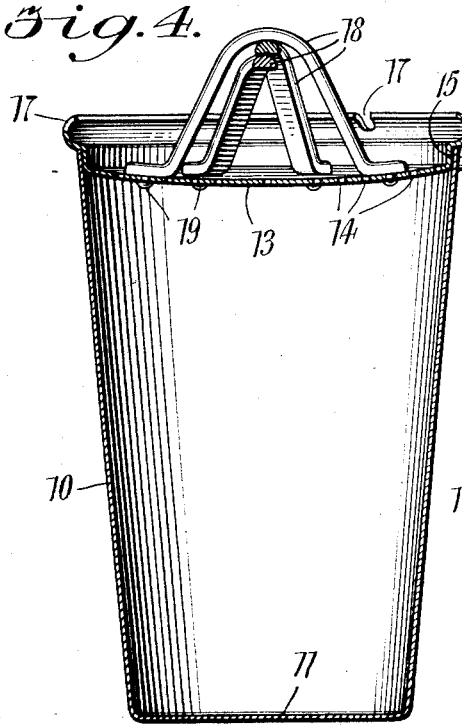
Figure 4 is a longitudinal sectional view of the outer container with the cover in an inverted position as when used in extracting the juice of fruit.
Figure 5:
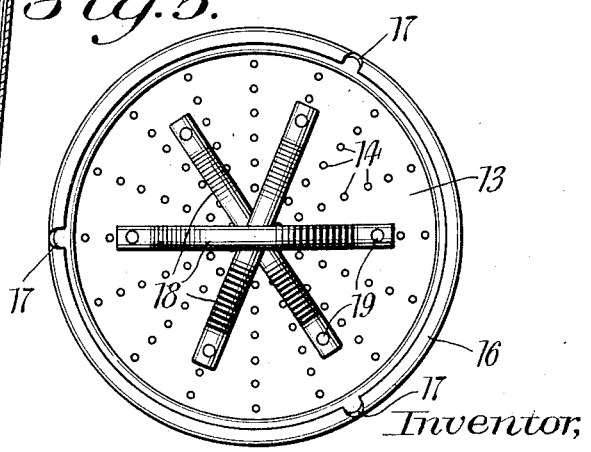
Figure 5 is a plan view of the same.

The band 15 is adapted to neatly fit within the upper end of the container 10 when disposed therewithin, as shown in Figure 4, at which time the bead 16 rests upon the edge of the container, while in a normal position, as shown in Figure 1, the inner open edge of the bead encloses the top of the container.

The inturned edge of the bead 16 contains notches 17 suited to engage over the pins 12, after which the cover may be partially turned, causing the pins to pass into the interior space within the bead, thus locking the cover into position.

Fixed on the concave side of the cover 13 are a plurality of arcuately bent bars 18 crossing each other at their raised portions to constitute a scoring device for the obtaining of the juice of fruits, such as lemons and oranges, when in the position shown in Figure 4, the bead and band acting as guides for the juice which passes through the perforations 14 into the container 10, the bars being secured to the cover by rivets 19.

An inner container 20, spaced parallel to the wall 10 of the outer container, is provided with an integral bottom 21, the larger end being open.

A flat, washer-like ring 22 rests over the top of the inner container and is provided with a down-turned annular flange 23 fitting within the outer container 10 and around the inner container 20, acting as a spacer therebetween.

Attached by rivets 24 to the underside of the ring 22 are a pair of supports 25 bent downwardly to form loops crossed at the center, as at 26, these elements supporting a plurality of thin metallic cups 27 nested one within the other as shown in Figure 1.

The normal condition of the device shown in this figure indicates a complete assemblage which is dismounted by removing the cover and then the inner container and drinking cups 27.

The cover is replaced in an inverted position, as in Figure 4, for the fruit juicing operation, such liquids as are desired being placed in the outer container, the cover again removed and the inner container reversed and entered into the outer container tightly so that no liquid may become lost during the shaking and mixing operation, which is performed in the usual and customary manner.

This having been accomplished the inner container is removed and the cover replaced as in Figure 1 and the contents poured out through the perforations, which retain the seeds, etc., into the cups 27 ready to be served.

Having thus described my invention and set forth the manner of its construction and use, what I claim as new and desire to secure by Letters Patent, is:—

1. A refreshment shaker and top comprising an outer vessel, an inner vessel adapted to nest within the outer vessel and to be reversed and its open end inserted in the open end of the outer vessel to constitute a shaker, a common top for both vessels when nested, said top comprising a portion having a periphery adapted to fit in the outer end of the outer vessel when in one position, said outer portion of the top also having a portion adapted to embrace the outer vessel, said top when said inner vessel is nested in the outer vessel being adapted to cover both vessels and hold one nested within the other.

2. A refreshment shaker and combined strainer and top comprising an outer vessel, an inner vessel adapted to mesh within the outer vessel and to be reversed and its open end inserted in the open end of the outer vessel to constitute a shaker, a common top for both vessels when nested, said top comprising a central strainer portion with a portion having a periphery adapted to fit into the outer end of the outer vessel when in one position, said outer portion of the top further including a portion adapted to embrace the outer vessel, said top and said inner vessel when nested in the outer vessel being adapted to cover both vessels and hold one nested within the other.

3. A refreshment shaker, squeezer and combined strainer and top with means for retaining them in compact condition, said shaker comprising an outer vessel, and an inner vessel adapted to snugly fit within the same, a top adapted to fit over the open end of the outer vessel, said top including a central strainer portion and a band to fit within the open end of said outer vessel, a strap supported at the top of said inner vessel and extending downwardly thereinto and adapted to sustain a cup or cups within the inner vessel.

4. A refreshment shaker, squeezer and strainer comprising an outer vessel, an inner vessel adapted to fit snugly within the outer vessel, a top with a portion adapted to extend around the open end of the outer vessel with means for attaching it to the outer vessel, said top also comprising a central strainer portion surrounded by a band adapted to fit within the top of the outer vessel, said top also comprising a fruit squeezer attached thereto and adapted to extend downwardly into both vessels from said top, a strap supported from the top of the inner vessel and extending downwardly into said vessels when nested, said strap being adapted to hold a cup or cups within the said vessels and below the top when the same is attached to the top of the outer vessel.

5. A refreshment shaker, squeezer and combined strainer and top, with means for retaining them in compact condition, said shaker comprising a large vessel and several smaller vessels adapted to be nested within the large vessel, a top adapted to fit over the open end of the large vessel said top including a central strainer portion and a band or ledge to fit within the open end of said large vessel, means supported at the top of said large vessel and extending downwardly thereinto and adapted to sustain the several smaller inner vessels in their nested condition in the larger vessel and held therein by said combined strainer and top.

In witness whereof I have affixed my signature.

GUS M. KATZ